United States Patent
Radens et al.

(10) Patent No.: US 11,977,614 B2
(45) Date of Patent: May 7, 2024

(54) CIRCUIT DESIGN WATERMARKING

(71) Applicant: INTERNATIONAL BUSINESS MACHINES CORPORATION, Armonk, NY (US)

(72) Inventors: Carl Radens, LaGrangeville, NY (US); Lawrence A. Clevenger, Saratoga Springs, NY (US); Daniel James Dechene, Albany, NY (US); Hsueh-Chung Chen, Cohoes, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 473 days.

(21) Appl. No.: 17/479,623

(22) Filed: Sep. 20, 2021

(65) Prior Publication Data
US 2023/0090521 A1   Mar. 23, 2023

(51) Int. Cl.
| | |
|---|---|
| *G06F 30/00* | (2020.01) |
| *G06F 21/16* | (2013.01) |
| *G06F 30/20* | (2020.01) |
| *G06F 30/30* | (2020.01) |
| *H05K 3/00* | (2006.01) |

(52) U.S. Cl.
CPC ............. *G06F 21/16* (2013.01); *G06F 30/00* (2020.01); *G06F 30/20* (2020.01); *G06F 30/30* (2020.01); *H05K 3/00* (2013.01)

(58) Field of Classification Search
CPC .......... G06F 21/16; G06F 30/00; G06F 30/20; G06F 30/30; G06F 30/327; G06F 30/39; H05K 3/00
See application file for complete search history.

(56) References Cited

U.S. PATENT DOCUMENTS

| | | | |
|---|---|---|---|
| 5,533,123 A | 6/1996 | Force et al. | |
| 6,625,780 B1 * | 9/2003 | Charbon | G06F 30/30 716/111 |
| 7,061,083 B1 | 6/2006 | Usami et al. | |
| 7,577,926 B2 | 8/2009 | Bretschneider | |
| 7,801,325 B1 * | 9/2010 | Hetzel | G06T 1/0028 713/176 |
| 8,089,285 B2 | 1/2012 | Hsu et al. | |
| 8,402,401 B2 | 3/2013 | Chakraborty et al. | |

(Continued)

FOREIGN PATENT DOCUMENTS

| | | |
|---|---|---|
| CN | 109585419 A | 4/2019 |
| KR | 101868548 B1 | 6/2018 |
| WO | 2020125839 A1 | 6/2020 |

*Primary Examiner* — Stacy Whitmore
(74) *Attorney, Agent, or Firm* — Tutunjian & Bitetto, P.C.; Samuel Waldbaum

(57) ABSTRACT

Methods and systems for watermarking a circuit design include defining a watermarked cell library that includes cells, each of which defines a design structure that corresponds to a manufacturable physical structure, at least one of which being a watermarked call that includes a watermark. The watermark is encoded using a design structure that extends beyond a respective cell boundary. A first circuit design file is generated for a device to be manufactured. The first circuit design file including at least one watermarked cell. The first circuit design file is sent to a manufacturer for fabrication of a corresponding device that includes a watermark structure that encodes an identifier.

20 Claims, 8 Drawing Sheets

(56) References Cited

U.S. PATENT DOCUMENTS

| | | |
|---|---|---|
| 8,564,073 B1 | 10/2013 | Clark, Jr. et al. |
| 10,607,948 B2 | 3/2020 | Dekker |
| 10,671,700 B2 | 6/2020 | Irissou et al. |
| 10,970,453 B2 | 4/2021 | Madani et al. |
| 2002/0118394 A1* | 8/2002 | Mckinley ............ G06Q 30/0236 |
| | | 358/3.28 |
| 2016/0197616 A1* | 7/2016 | Cocchi .................... G06F 30/39 |
| | | 326/41 |
| 2018/0341737 A1* | 11/2018 | Chow ................. H01L 27/0207 |
| 2020/0125839 A1 | 4/2020 | Chen et al. |

* cited by examiner

CIRCUIT DESIGN WATERMARKING

BACKGROUND

The present invention generally relates to integrated circuit design, and, more particularly, to watermarking integrated circuit designs.

The design of an integrated circuit may be created by a separate entity from that which manufactures the circuit. As a result, the design of the integrated circuit may leave the direct control of the designer when it is sent to the manufacturer. This exposes the design to the risk of being copied, leaked, or stolen, which jeopardizes the designer's intellectual property.

SUMMARY

A method for watermarking a circuit design includes defining a watermarked cell library that includes cells, each of which defines a design structure that corresponds to a manufacturable physical structure, at least one of which being a watermarked call that includes a watermark. The watermark is encoded using a design structure that extends beyond a respective cell boundary. A first circuit design file is generated for a device to be manufactured. The first circuit design file including at least one watermarked cell. The first circuit design file is sent to a manufacturer for fabrication of a corresponding device that includes a watermark structure that encodes an identifier.

A system for watermarking a circuit design includes a hardware processor and a memory that stores a computer program. When the computer program is executed by the hardware processor, it causes the hardware processor to define a watermarked cell library that includes cells, each of which defines a design structure that corresponds to a manufacturable physical structure, at least one of which being a watermarked call that includes a watermark, to generate a first circuit design file for a device to be manufactured, the first circuit design file including at least one watermarked cell, and to send the first circuit design file to a manufacturer for fabrication of a corresponding device. The watermark being encoded using a design structure that extends beyond a respective cell boundary that includes a watermark structure that encodes an identifier.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

By making subtle alterations to a chip design, a design may effectively be watermarked, such that analysis of a device can definitely show whether or not the device was made using the design. Such watermarking may be used to identify the source of a leak, for example by providing designs with different watermarks to different downstream parties. Watermarking may also be used to indicate that a device is likely to include structures that infringe a patent, for example by showing that a design which embodies the patent was used to make the device.

Exemplary design watermarking may include, for example, modifying the lengths of structures within the design. The watermark may be applied to structures which do not affect the functioning of the device. The lengths of these structures may be used to encode an identifier, such as a serial number or other code. By observing the resulting device under a microscope, these structures can be readily seen and can be used to reproduce the code. In some cases, the design may be watermarked in such a way that the ultimate device is not affected. In such design-only watermarks, the design file itself may be analyzed to find the identifier.

Figure 1:
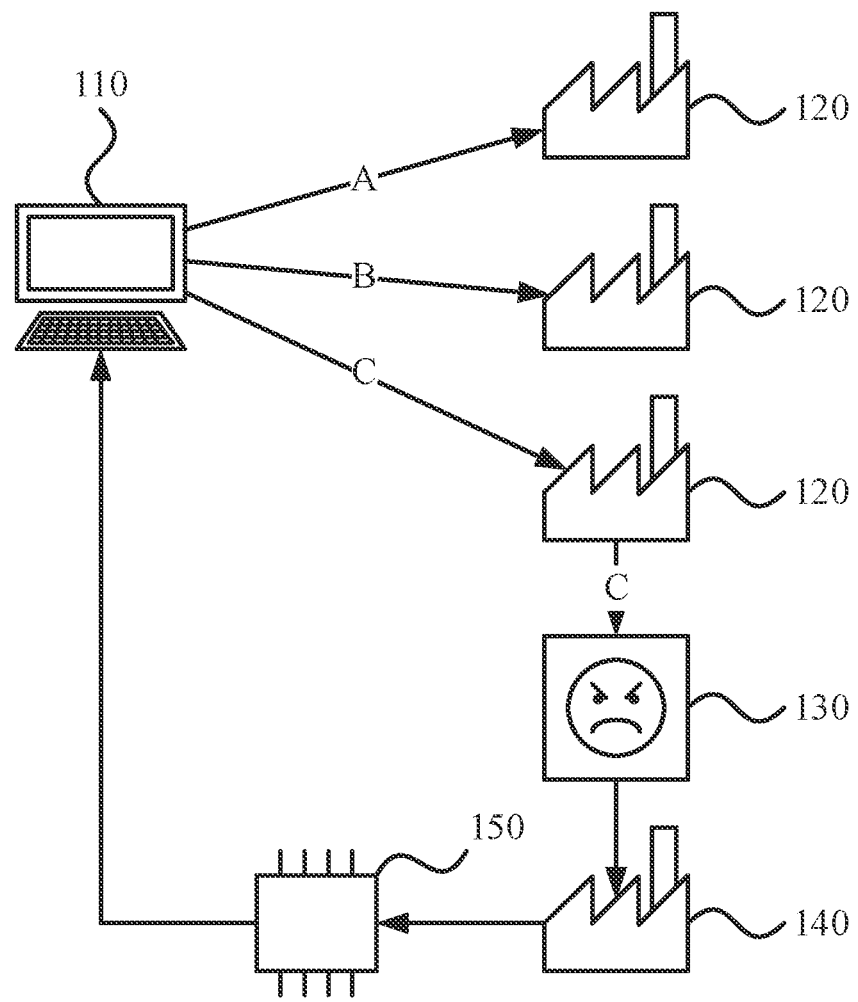
FIG. 1 is a diagram of a process by which a watermarked circuit design file may be misappropriated to create an infringing device, with the infringing device being analyzed to identify the watermark, in accordance with an embodiment of the present invention.

Referring now to FIG. 1, a diagram illustrates how a watermarked design may be used. This scenario is presented solely for the sake of illustration, and should not be interpreted as being limiting. A circuit designer 110 creates a design file that represents instructions for fabricating a device. The circuit designer 110 transmits the design file to a set of different manufacturers 120. In some cases, different manufacturers 120 may receive a different version of the design file, labeled here as A, B, and C. Each design file includes a different respective watermark. In some cases, each manufacturer 120 may receive the same design file, with the same watermark.

In this scenario, a third party 130 obtains design file C. This may be through an intentional or unintentional leak, corporate espionage, trade secret theft, or illicit network intrusion. The third party 130 uses the design file at a third party manufacturer 140 to fabricate a device 150. The device 150 includes physical structures that encode the watermark for design file C. The circuit designer 110 obtains the device 150. By analyzing the device 150, for example by performing a cross-section of the device 150 or by observing the device 150 under a microscope, the circuit designer 110 can verify that the device was made using design file C.

This knowledge can benefit the circuit designer 110 in various ways. In some cases, this can be used to identify a leak, so that the manufacturer 120 that was sent design file C may be excluded from future projects. In other cases, the knowledge that the device 150 was fabricated using a watermarked design can help the circuit designer to identify infringements of intellectual property.

In other scenarios, rather than recovering a physical device 150 that was made using a watermarked design file, the circuit designer 110 may be able to recover the leaked design file itself. In such a case, the circuit designer 110 may analyze the design file to identify the watermark encoded therein, and may use the knowledge gleaned by that analysis in a manner similar to that described above.

Figure 2:
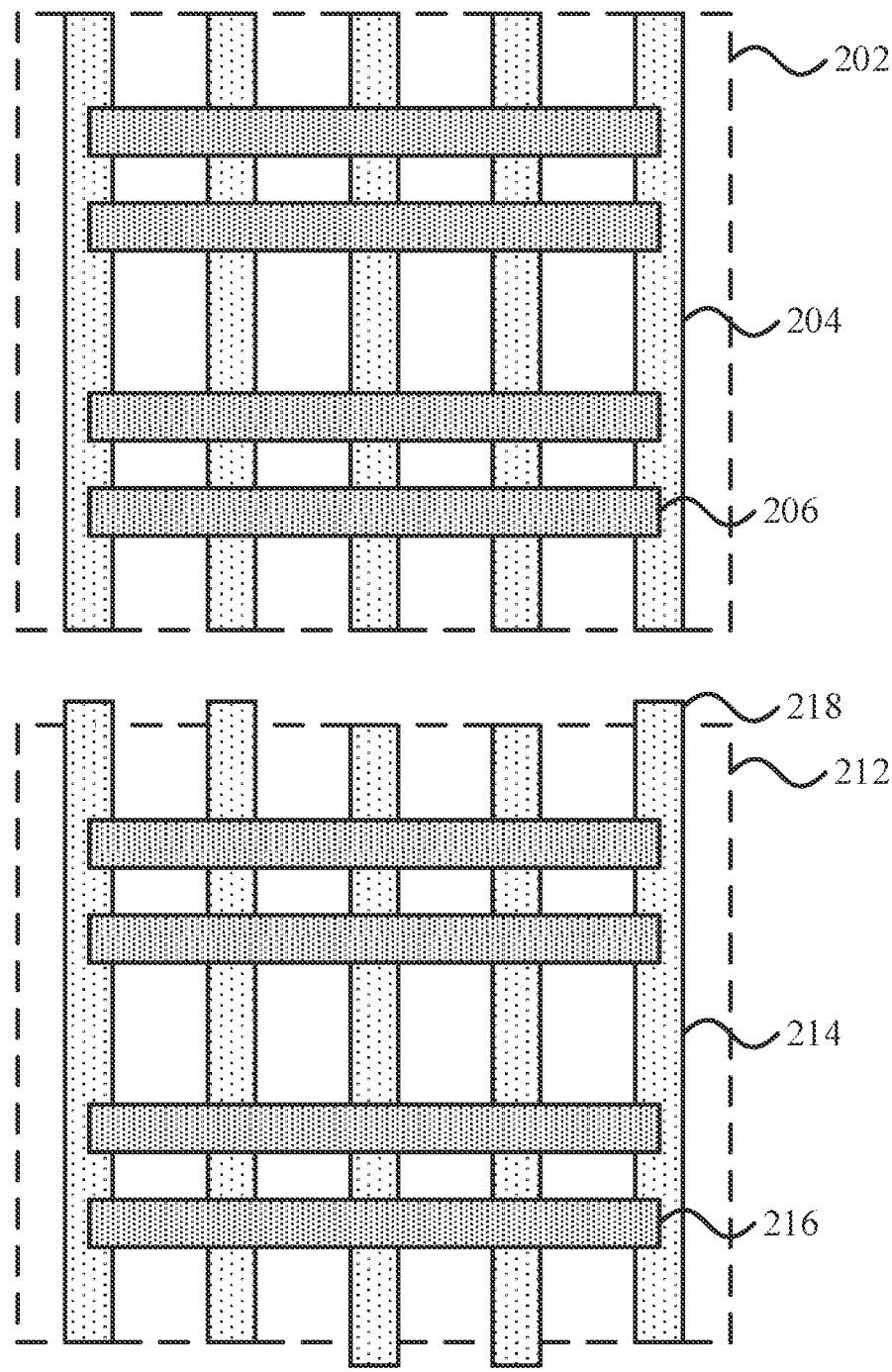
FIG. 2 is a diagram comparing a watermarked circuit design cell to an un-watermarked circuit design cell, showing differences between the structures of the two, in accordance with an embodiment of the present invention.

Referring now to FIG. 2, a comparison is shown between two logic blocks. These logic blocks may be stored in a cell library that includes a variety of different circuit design parts. When creating a circuit design, a circuit designer 110 may use these libraries to quickly generate complex structures. A logic block may have a variety of different structures.

In this illustrative example, an unwatermarked first logic block 202 is compared with a watermarked second logic block 212. The first logic block 202 includes a set of fins 204 and gates 206, and the second logic block includes a respective set of fins 214 and gates 218. Notably, the two logic blocks shown differ in the lengths of their fins, with the fins 214 of the watermarked logic block 212 being longer than the fins 204 of the unwatermarked logic block 202. It is particularly contemplated that the watermarked logic block 212 may be implemented using cells in the cell library that are frequently used in circuit designs, to maximize their occurrence within designs.

The additional lengths 218 of the longer fins 214 can be used to encode information. In one illustrative example, a binary value may be encoded by whether the additional length 218 is on the "top" or "bottom" of the watermarked logic block 212, with a length 218 on the "top" indicating an exemplary binary value of 1, and with a length 218 on the "bottom" indicating an exemplary binary value of 0. As an alternative, the additional lengths 218 may be used on one side of the logic block 212, with the presence of an additional length 218 indicating a first binary value and the absence of an additional length 218 indicating a second binary value. In a further alternative, the size of the additional lengths 218 may be used to encode non-binary values. For example, multiple different sizes may be used, with each size corresponding to a different numerical value. In a further alternative, some fins 214 may have additional lengths 218 on both the top and the bottom of the logic block 212. In such an embodiment, the top and the bottom may encode different information.

Following this example, a number of unique codewords that can be created within a particular logic block may be a function of three parameters: a maximum extension X of the additional lengths 218, a total cell contact poly pitch (CPP) C, and a layout grid size. The maximum extension X may represent the maximum distance of the additional length 218 beyond the outline of the logic block 212. The layout grid size may be fixed for a given fabrication technology. The number of unique codewords would then be $$\left(\frac{X}{\xi}\right)^{2C} - 1.$$

Figure 3:
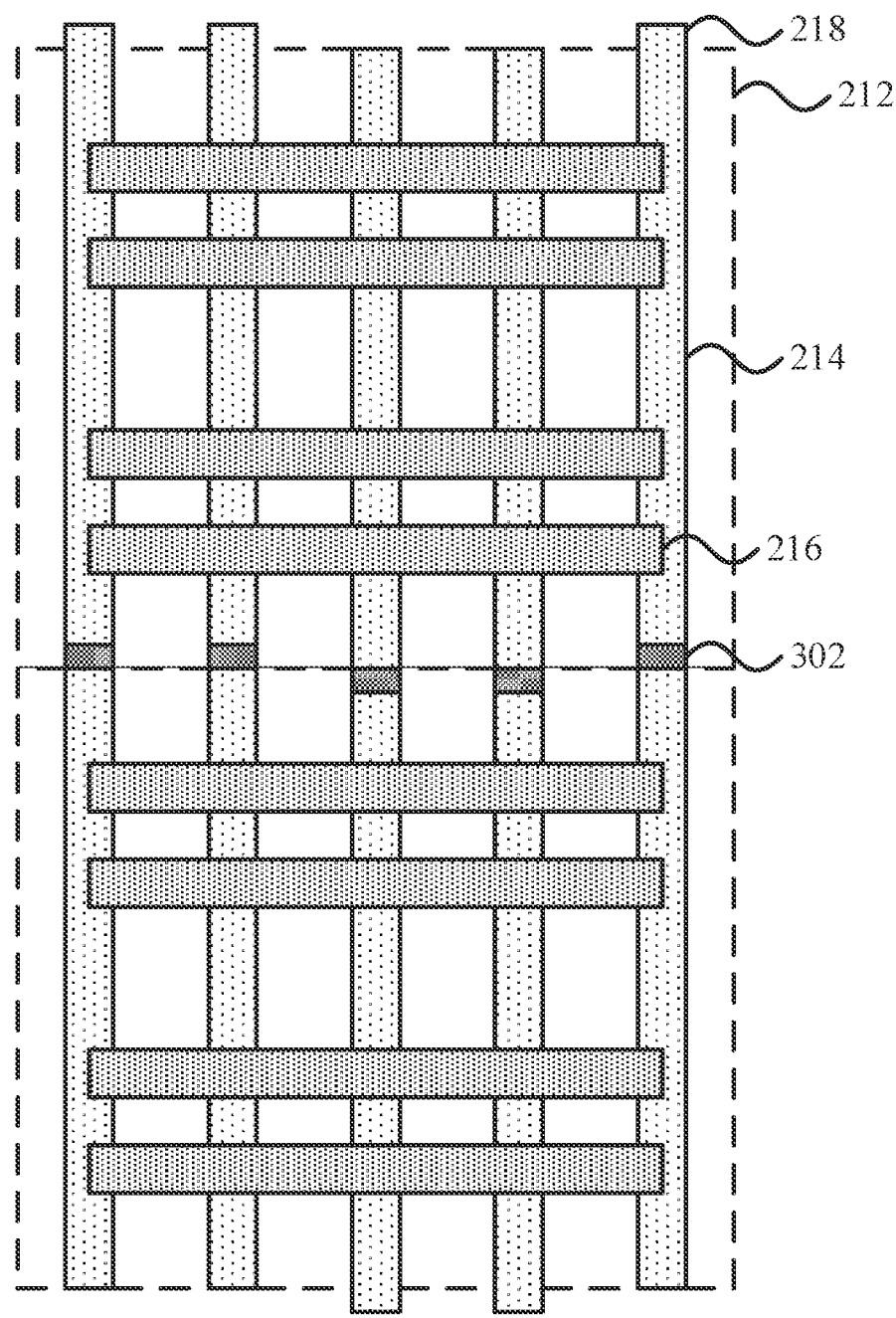
FIG. 3 is a diagram showing two watermarked circuit design cells being placed next to one another, such that watermark-encoding structures that extend beyond cell boundaries may overlap with neighboring cell structures, in accordance with an embodiment of the present invention.

Referring now to FIG. 3, an exemplary pair of neighboring logic blocks is shown. In this example, two logic blocks are placed directly next to one another in a circuit design. Because the additional lengths 218 of their fins 214 extend past the boundaries of the logic block 212, the fins of one logic block 212 may extend into a neighboring logic block.

To prevent conflicts, the watermark may be added to designs that can be stacked without conflict. In this present example, the fins 214 of one logic block overlap with the fins 214 of the neighboring logic block. Thus, any overlap 302 that might result from the additional lengths 218 reaching into a neighboring logic block would not cause a detrimental effect to the ultimate design, as the overlap could be safely ignored.

Thus, when logic blocks overlap in this manner, the watermark is encoded at the periphery of the manufactured device. A place-and-route process may group a large number of such logic blocks together for functional purposes, but an open area may be placed around a tiled pattern of such logic blocks, to meet design rules. At this border, the encoded watermark will be visible. Furthermore, when viewed at a relatively high level of abstraction, with only the general boundaries of the cell being shown, the variations that encode the watermark may not be visible at all. In that case, only zooming in to the granularity of individual structures would show the differences in lengths.

Figure 4:
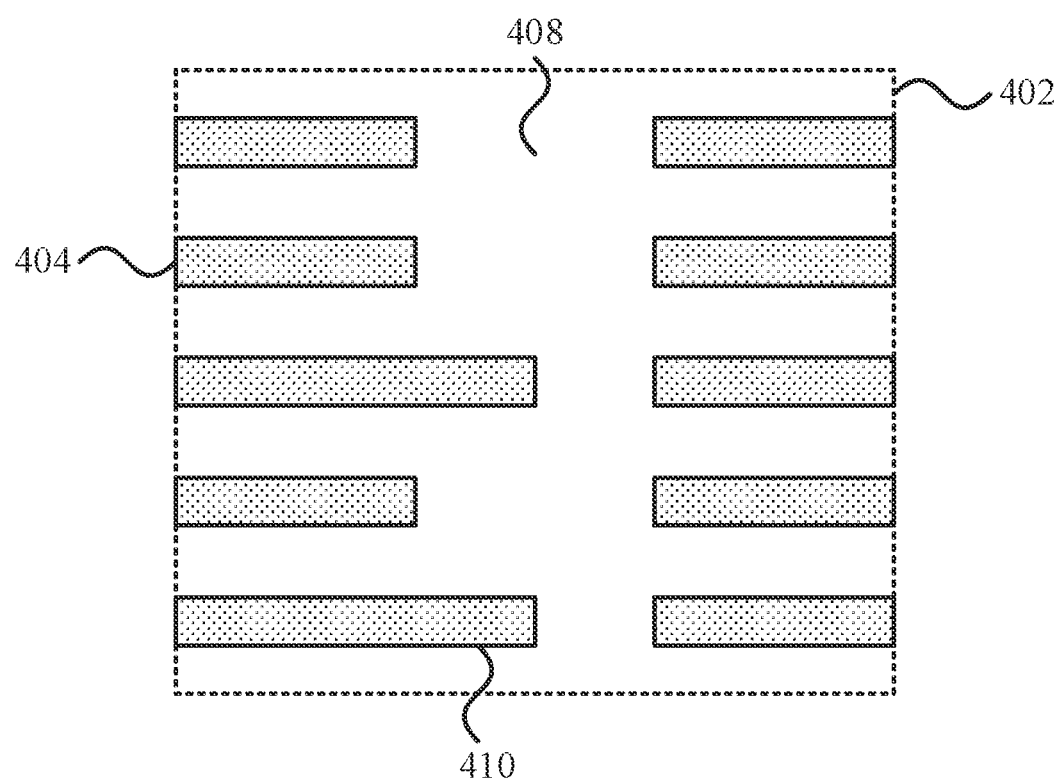
FIG. 4 is a diagram that shows sacrificial watermark-encoding circuit design structures that extend into whitespace of a circuit design, in accordance with an embodiment of the present invention.

Referring now to FIG. 4, a step in an exemplary watermarking scheme is shown. This illustrative view shows a magnified portion 402 of a larger circuit design. The view 402 shows the location of mandrels 404, which may be formed on a substrate. Between different regions of the design, there may be certain areas of whitespace 408. Such white space may be located, for example, at the edge of an array of devices, and is generally non-functional in the ultimate fabricated device. For example, such white space may occur when a placing and routing leaves a gap between neighboring arrays of components, without room for additional components in between. While the bulk of such whitespace may be filled by, e.g., an interlayer dielectric, there may remain some whitespace between the design components and the fill. Similarly, there may not be any fill between neighboring arrays, due to only having a small area.

This whitespace 408 may be used for watermarking, in a manner similar to that described above. In this illustrative example, the mandrels 404 may include an additional length 410 that extends into whitespace 408. These additional lengths 410 can be used to encode values as above. However, mandrels are often removed during processing, such as in a self-aligned double patterning process. Thus, if these additional lengths 410 are left without further modification, they may not imply any change to the manufactured device. This may be used in some cases to generate a design-only watermark, where the design file will show the watermark, but the device will not.

Figure 5:
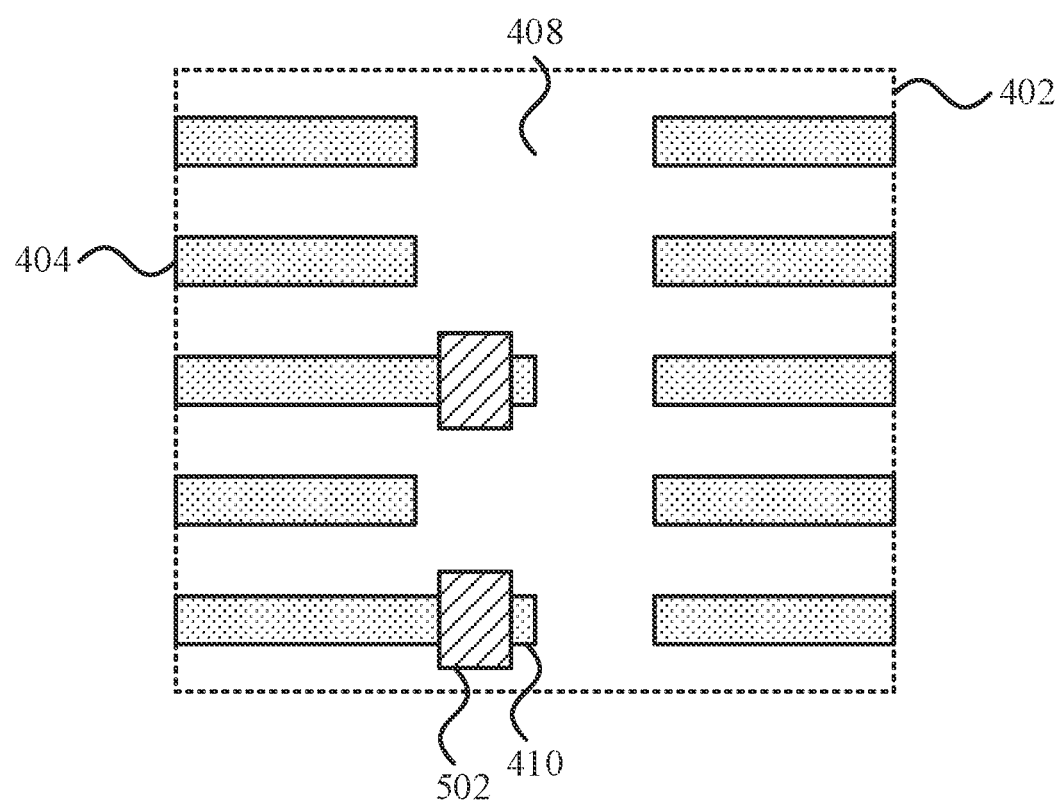
FIG. 5 is a diagram that shows sacrificial watermark-encoding circuit design structures that extend into whitespace of a circuit design and that include keep masks to preserve the watermark-encoding circuit design structures in a fabricated device, in accordance with an embodiment of the present invention.

Referring now to FIG. 5, a step in an exemplary watermarking scheme is shown. Similar to the watermark of FIG. 4, the mandrels 404 may have additional lengths 410 that extend into a whitespace 408. In this view, however, the additional lengths 410 have been covered by a mask 502. This mask 502 may be used to preserve portions of the mandrels 404 during regular processing steps, for example to identify regions where fins will ultimately be formed. By covering the additional lengths 410, the mask 502 preserves the additional lengths 410 for these subsequent processing steps, such that there may remain structures related to the additional lengths 410 in the manufactured device. Thus, this watermark scheme will be apparent in both the design file and in any device that is manufactured using the design file.

In this example, the circuit design file may provide modified instructions for multiple different stages of chip fabrication. For example, the structure and locations of the mandrels 404 may be defined in a first patterning step, while the structure and locations of the masks 502 may be defined in a subsequent patterning step. Watermarking information may be added at different patterning steps as well, including single-exposure direct patterning, multiple-exposure direct patterning, direct patterning with cuts (where cut masks are used in the process step), self-aligned double, triple, or quadruple patterning with no keep mask, and self-aligned double, triple, or quadruple patterning with keep masks to preserve the watermarking.

Additionally, other types of watermarking structures may be used. For example, dummy via arrays may be used to embed a watermark encoding. A metal dummy pattern may similarly be used to encode watermarking information. Thus, the cell definitions in a circuit design library may be modified in any appropriate way to generate repeatable, observable watermarking structures, which are not immediately apparent to a potential infringer who does not know what to look for.

Figure 6:
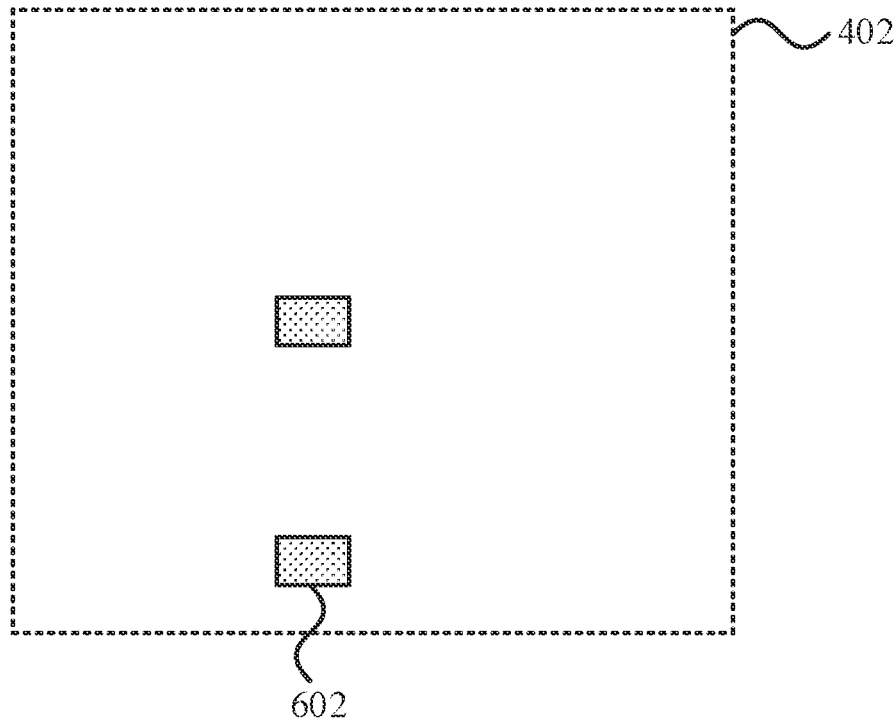
FIG. 6 is a diagram illustrating watermark-encoding structures in a whitespace of a fabricated device after the remaining sacrificial structures have been removed, in accordance with an embodiment of the present invention.

Referring now to FIG. 6, a step in an exemplary watermarking scheme is shown. This view shows the chip during the manufacturing process, after the mask 502 has been applied, after the exposed mandrel 410 has been etched away, and after the mask 502 has been removed. The removal of the mask 502 exposes the remaining pieces of the mandrel 410, which were covered by the mask 502 during the etch of the mandrel 410. Subsequent steps, such as an isotropic etch of an underlying layer using remaining mandrel regions 602 as a mask, or self-aligned double patterning that forms sidewall fins on the remaining mandrel regions 602, will leave a structure on the device that will be visible during analysis.

Figure 7:
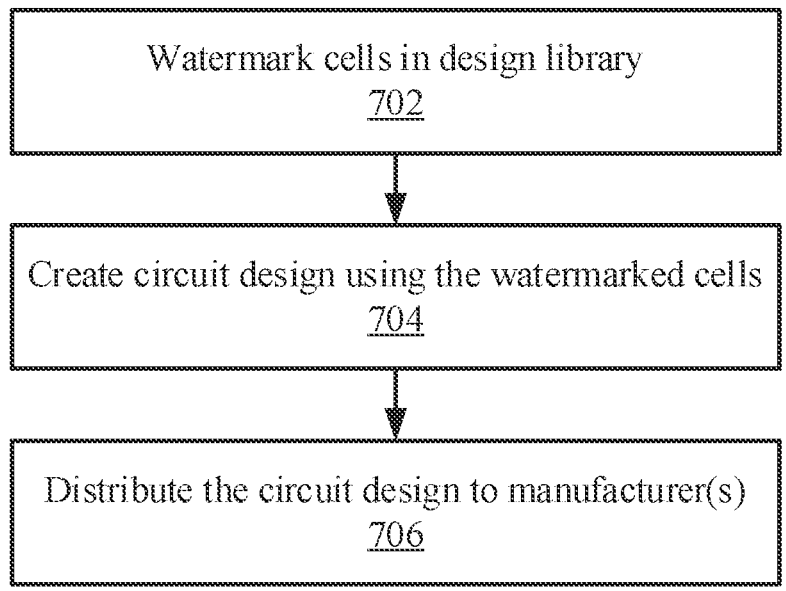
FIG. 7 is a block/flow diagram of a method for watermarking a circuit design, in accordance with an embodiment of the present invention.

Referring now to FIG. 7, a method for watermarking a circuit design is shown. Block 702 watermarks cells in a design library. As noted above, the design library may include cells with a variety of different logic blocks, each of which may be associated with a different function and different physical structures. These cells may, for example, provide instructions to a device manufacturer on how to create functional structures on a device. As noted above, the watermark may be encoded in the lengths of structures that are defined within the cells, and may include structures that are formed in multiple distinct processing steps. Additionally, the watermark may be a design-only watermark, which may not produce physical differences in a manufactured device. The watermark may alternatively be a design-plus-device watermark, where the manufactured device includes observable physical structures that can be used to extract the watermark.

In block 704, the circuit designer 110 creates a watermarked circuit design file using the library. The watermarked circuit design file includes one or more watermarked logic blocks. As noted above, the design file may undergo automated place-and-route, which automatically organizes the circuit design into a space-efficient layout while maintaining functional connections between components. The watermark is selected such that the watermark structures will survive the place-and-route process to preserve an identifiable watermark when the device is manufactured.

In block 706, the circuit designer 110 distributes the watermarked circuit design to one or more manufacturers 120. As noted above, each manufacturer may receive a circuit design file that includes a different encoded watermark, to make the products that they produce distinguishable under a microscope. This step may also include transmitting the design library to the manufacturer, if it is needed for the manufacturer to properly interpret the circuit design. In such a case, it may be advantageous to include cells in the design library that use watermarked cells which will not result in changes in the manufactured device—this makes it possible to identify new designs that have been created with a misappropriated design library, even if the infringer would otherwise notice a watermark on a physical device.

Figure 8:
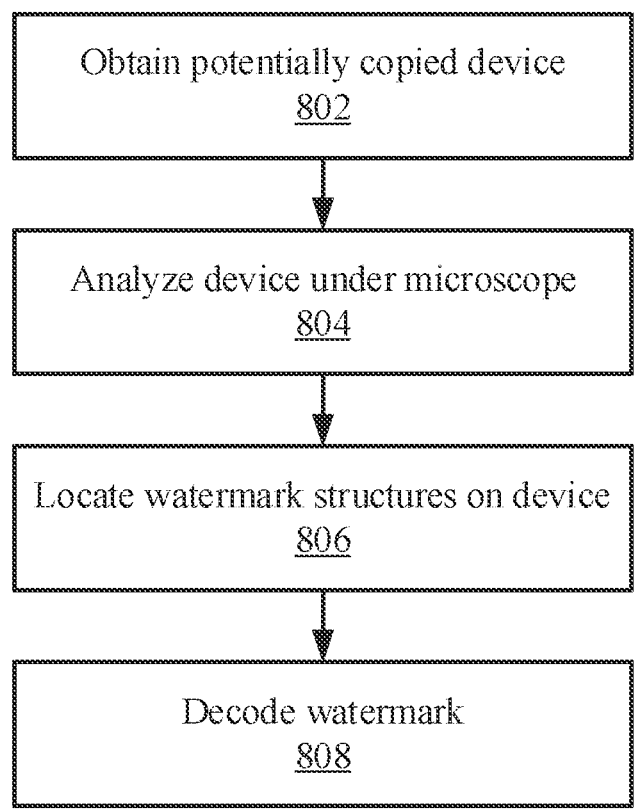
FIG. 8 is a block/flow diagram of a method for decoding a watermark in a fabricated device, in accordance with an embodiment of the present invention.

Referring now to FIG. 8, a method for detecting and decoding a watermark on a device is shown. In block 702, a device is obtained which may have been copied from a watermarked design file, or may have been designed using a library that included watermarked cells. This device may include, for example, an integrated chip, or a larger device that includes an integrated chip in it. The device may be disassembled to expose the device components that are potentially watermarked. For example, a cross-section of the device may be performed, using an appropriate saw or other tool.

Block 804 then analyzes the device under a microscope or any other appropriate tool. For example, this analysis may include locating cells that correspond to cells that have been watermarked within a design library. These cells may then be checked in detail, in block 806, for deviations from a norm (e.g., lengths of structures that exceed a cell boundary) that correspond to a watermark. These deviations serve to identify the location of the watermark. The watermark may then be decoded in block 808, for example by determining binary values that correspond to the deviations. Once the watermark has been decoded, appropriate action may be taken against the manufacturer of the device, or the source of a leak.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

It is to be understood that aspects of the present invention will be described in terms of a given illustrative architecture; however, other architectures, structures, substrate materials and process features and steps can be varied within the scope of aspects of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer can transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements can be included in the compound and still function in accordance with the present principles. The compounds with additional elements will be referred to herein as alloys.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative teams are intended to encompass different orientations of the device in use or operation in addition to the orientation depicted in the FIGS. For example, if the device in the FIGS. is turned over, elements described as "below" "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Figure 9:
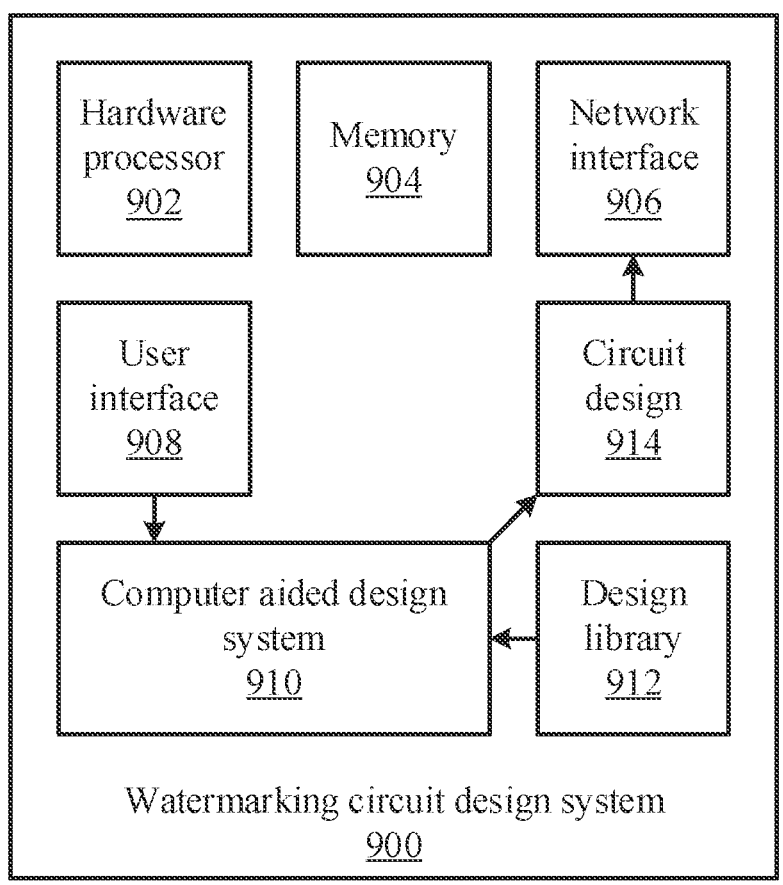
FIG. 9 is a block diagram of a watermarking circuit design system, in accordance with an embodiment of the present invention.

Referring now to FIG. 9, a watermarking circuit design system 900 is shown. The watermarking circuit design system 900 may be used by a circuit designer 110 to generate a watermarked circuit design. The system 900 includes a hardware processor and a memory 904. A number of functional components may be implemented in the form of software that is stored in the memory 904 and that is executed by the hardware processor 902. In some embodiments, one or more of the functional components may be implemented in the form of discrete hardware components, for example as ASICs or FPGAs. A network interface 906 provides communications with other systems, such as the manufacturers 120.

A user interface 908 accepts inputs from a circuit designer using a computer aided design (CAD) system 910. The CAD system 910 accesses a design library 912 that includes watermarked cells. As described above, these watermarked cells may have design features that can be used to encode specific identifiers as a watermark. The user thereby creates a circuit design 914, which may be sent to the manufacturers 120.

The same circuit design 914 may be watermarked with multiple distinct encoded identifiers. For example, the design library may include multiple versions of a given cell, each of which may encode a different value. These differently watermarked circuit designs 914 may then be forwarded to different manufacturers 120.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a circuit design watermarking (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method of watermarking a circuit design, comprising:
defining a watermarked cell library that includes a plurality of cells, each of which defines a design structure that corresponds to a manufacturable physical structure, at least one of which being a watermarked call that includes a watermark, the watermark being encoded using a design structure that extends beyond a respective cell boundary;
generating a first circuit design file for a device to be manufactured, the first circuit design file including at least one watermarked cell; and
sending the first circuit design file to a manufacturer for fabrication of a corresponding device that includes a watermark structure that encodes an identifier.

2. The method of claim 1, wherein generating the first circuit design file includes a computer aided design process that accesses cells from the watermarked cell library, including the watermarked cell.

3. The method of claim 2, wherein defining the watermarked cell library includes generating a plurality of watermarked cells in the design library that correspond to an original cell, each watermarked cell having a different encoded identifier.

4. The method of claim 3, further comprising generating a second circuit design file for the device to be manufactured, the second design file including at least one watermarked cell that has a different encoded identifier than the identifier encoded by the at least one watermark of the first design file.

5. The method of claim 2, wherein generating the first circuit design file includes placing multiple watermarked cells next to one another, including a first watermarked cell with a structure that extends into a cell boundary of a second watermarked cell and that overlaps with a structure of the second watermarked cell.

6. The method of claim 1, wherein the structure that extends beyond a respective cell boundary extends into a whitespace portion of the circuit design file.

7. The method of claim 1, wherein the structure that extends beyond a respective cell boundary includes a structure that is removed during fabrication.

8. The method of claim 1, wherein the structure that extends beyond the respective cell boundary includes a structure that is preserved through fabrication to remain in a finished device.

9. The method of claim 8, wherein the structure that extends beyond the respective cell boundary includes a sacrificial structure that is covered by a protective structure.

10. The method of claim 1, further comprising sending the watermarked design library to the manufacturer.

11. A computer program product for watermarking a circuit design, the computer program product comprising a computer readable storage medium having program instructions embodied therewith, the program instructions being executable by a hardware processor to cause the hardware processor to:
define a watermarked cell library that includes a plurality of cells, each of which defines a design structure that corresponds to a manufacturable physical structure, at least one of which being a watermarked call that includes a watermark, the watermark being encoded using a design structure that extends beyond a respective cell boundary;
generate a first circuit design file for a device to be manufactured, the first circuit design file including at least one watermarked cell; and
send the first circuit design file to a manufacturer for fabrication of a corresponding device that includes a watermark structure that encodes an identifier.

12. A system for watermarking a circuit design, comprising:
a hardware processor; and
a memory that stores a computer program, which, when executed by the hardware processor, causes the hardware processor to:
define a watermarked cell library that includes a plurality of cells, each of which defines a design structure that corresponds to a manufacturable physical structure, at least one of which being a watermarked call that includes a watermark, the watermark being encoded using a design structure that extends beyond a respective cell boundary;
generate a first circuit design file for a device to be manufactured, the first circuit design file including at least one watermarked cell; and
send the first circuit design file to a manufacturer for fabrication of a corresponding device that includes a watermark structure that encodes an identifier.

13. The system of claim 12, wherein the computer program further causes the hardware processor to use a computer aided design process that accesses cells from the watermarked cell library, including the watermarked cell.

14. The system of claim 13, wherein the computer program further causes the hardware processor to generate a plurality of watermarked cells in the design library that correspond to an original cell, each watermarked cell having a different encoded identifier.

15. The system of claim 14, wherein the computer program further causes the hardware processor to generate a second circuit design file for the device to be manufactured, the second design file including at least one watermarked cell that has a different encoded identifier than the identifier encoded by the at least one watermark of the first design file.

16. The system of claim 13, wherein the computer program further causes the hardware processor to place multiple watermarked cells next to one another, including a first watermarked cell with a structure that extends into a cell boundary of a second watermarked cell and that overlaps with a structure of the second watermarked cell.

17. The system of claim 12, wherein the structure that extends beyond a respective cell boundary extends into a whitespace portion of the circuit design file.

18. The system of claim 12, wherein the structure that extends beyond a respective cell boundary includes a structure that is removed during fabrication.

19. The system of claim 12, wherein the structure that extends beyond the respective cell boundary includes a structure that is preserved through fabrication to remain in a finished device.

20. The system of claim 19, wherein the structure that extends beyond the respective cell boundary includes a sacrificial structure that is covered by a protective structure.

\* \* \* \* \*